United States Patent [19]

Heki et al.

[11] Patent Number: 4,596,298

[45] Date of Patent: Jun. 24, 1986

[54] CRAWLER VEHICLES

[75] Inventors: Hideaki Heki; Junzo Taguchi, both of Yokohama; Katsumi Kubo, Kawasaki, all of Japan

[73] Assignee: Tokyo Shibaura Denki Kabushiki Kaisha, Kawasaki, Japan

[21] Appl. No.: 507,346

[22] Filed: Jun. 24, 1983

[30] Foreign Application Priority Data

Jun. 26, 1982 [JP] Japan .................. 57-110143

[51] Int. Cl.[4] ............... B62D 11/20; B62D 55/10
[52] U.S. Cl. ............................. 180/9.46; 305/25
[58] Field of Search ............. 180/9.1, 9.46; 305/24, 305/25

[56] References Cited

U.S. PATENT DOCUMENTS

| 1,966,544 | 7/1934 | Dopp | 180/9.46 |
| 2,220,890 | 11/1940 | Cook | 180/9.1 |
| 2,383,754 | 8/1945 | Watt | 180/9.46 |
| 2,536,543 | 1/1951 | Focht | 180/9.46 |
| 2,878,883 | 3/1959 | France et al. | 180/9.1 |
| 3,417,832 | 12/1968 | Ziccardi et al. | 180/9.3 |
| 3,495,883 | 2/1970 | Fishbach | 180/9.46 X |
| 3,592,283 | 7/1971 | Fischbach | 180/9.44 |
| 4,029,165 | 6/1977 | Miller et al. | 180/9.46 X |

OTHER PUBLICATIONS

Gerhard Wolfgang Kohler et al.; *Manipulator Vehicles of the Nuclear Emergency Brigade in the Federal Republic of Germany*, pp. 196–218, Proceeding of 24th Conference on Remote System Technology, 1976.

J. A. Constant et al., *Teleoperators in the Nuclear Industry*, 3rd Conference on Industrial Robots; University of Nottingham, U.K., Mar. 24–26, 1976.

Magnus zum, "Uber die Entwicklung Leichter Raupenfahrzeuge zur Mond- und", Zeitschrift fur angewandte Mathematik und Physik, vol. 23, 1972.

Flume, "AUSA Show in Washington Nicht nur Neue Watten für die US Army", Wehrtechnik, No. 1, Jan. 1980.

*Primary Examiner*—John A. Pekar
*Attorney, Agent, or Firm*—Schwartz, Jeffery, Schwaab, Mack, Blumenthal & Evans

[57] ABSTRACT

A crawler driven vehicle is utilized in a dangerous environment and remotely controlled and operated. The crawler vehicle comprises a vehicle body, four arcuate front and rear crawler assemblies respectively attached to the bilateral sides of the vehicle body, each crawler assembly comprises a crawler formed by an endless belt and stretched over the periphery of the crawler assembly so as to exhibit arcuate surface contacting the running floor, a drive mechanism for driving the crawler assembly through a power transmission mechanism, and a steering mechanism for steering the front crawler assemblies.

7 Claims, 19 Drawing Figures

CRAWLER VEHICLES

BACKGROUND OF THE INVENTION

This invention relates to a four-crawler-driven vehicle which is moved on or along a floor in a dangerous environment by remote control or automatic control for inspection and maintenance in a nuclear plant, for example.

Generally, application of remotely operated robotic crawler vehicles to a nuclear plant such as an interior of the primary containment vessel for inspection and maintenance thereof is essential from the point of reducing radiation exposure dose to operation personnel. A robotic vehicle of this type comprises a main body on which controlling or operating equipment for inspection and maintenance is mounted, crawler assemblies attached on both sides of the body, a steering mechanism attached to the body for steering the crawler wheels, a drive mechanism for driving the crawler vehicle, and a power transmission mechanism for transmitting driving power from the driving mechanism to the crawler wheels.

However, a conventional crawler vehicle generally comprises one crawler assembly at each side thereof and is moved by the rotation of these crawler assemblies, so that the vehicle has less moving freedom and can move only in limited ways.

To obviate defects of the crawler vehicle of the type described above, there has been proposed a crawler vehicle provided with four crawler assemblies, two on the respective bilateral sides, for improving the moving freedom so that the crawler vehicle can move in a greater variety of ways. This four crawler vehicle is driven and steered by causing a speed difference in the crawler assemblies on the bilateral sides of the vehicle body. However, with the four crawler vehicle of this type, it is difficult to obtain an ideal moving state during the operation thereof for the reason that slipping degrees of crawlers of the crawler assemblies on both sides may widely be different according to varying conditions of a floor on which the crawler vehicle moves.

In addition, with the crawler vehicle, it is required to have a good performance for getting over obstacles or stepping up or down stairs or steps in the nuclear primary containment vessel, for example, as well as good steering performance. Although, in order to obtain an excellent obstacle-surmounting performance or step-up or -down performance, it is generally required to increase the diameter of a crawler wheel, this increase adversely affects the stability of a vehicle and load mounting space of the vehicle body.

SUMMARY OF THE INVENTION

An object of this invention is to provide a four-crawler-driven vehicle which can easily be steered and is exhibits excellent performance in getting over obstacles and climbing steps or slopes.

Another object of this invention is to provide a four-crawler-driven vehicle provided with four crawler assemblies each comprising an arcuate crawler easily and precisely running or moving on a floor or stairs.

According to this invention, there is provided a crawler driven vehicle remotely controlled and driven in a dangerous environment. The crawler vehicle is characterized by a vehicle body, four arcuate crawler assemblies comprising two front crawler assemblies and two rear crawler assemblies attached to the bilateral sides of the vehicle body, each crawler assembly comprising a crawler stretched over the periphery of the crawler assembly so as to exhibit an arcuate running surface contacting to a floor on which the crawler vehicle moves, drive means for driving the crawler assemblies, power transmitting means operatively connected to the drive means for transmitting driving force from the drive means to the crawler assemblies, and steering means operatively connected to the front crawler assemblies for steering the same.

DESCRIPTION OF THE PREFERRED EMBODIMENTS

Figure 1:
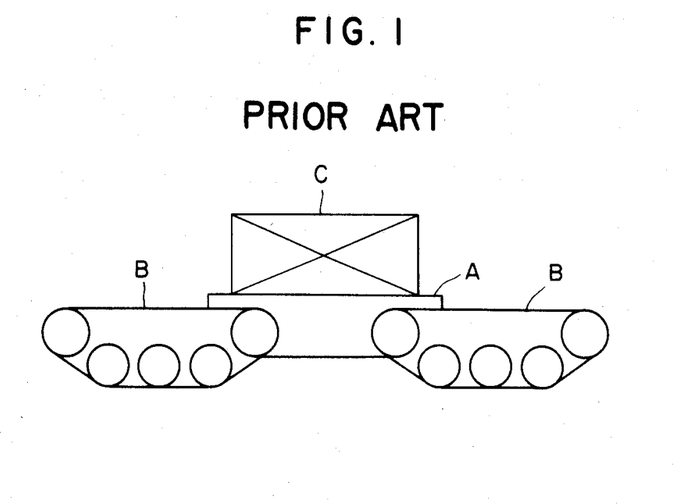
FIG. 1 is a schematic side view of a prior type four crawler vehicle.

FIG. 1 shows a schematic view of a crawler vehicle of conventional type to aid full understanding of the present invention, in which the crawler vehicle comprises a vehicle body A on which controlling and inspecting equipment C is mounted and four crawler assemblies B rotatably attached on both sides of the body A. The crawler vehicle further comprises a driving mechanism, a steering mechanism, and a power transmission mechanism which are generally known themselves and not shown in FIG. 1.

With the crawler vehicle shown in FIG. 1, four crawler assemblies B are attached to improve the moving degree of freedom of the respective crawler assemblies in comparison with a crawler vehicle having two crawler assemblies, one on each side. However, since the crawler vehicle of this type is steered by the speed difference of the bilaterally arranged crawler assemblies B, slipping or sliding degree is widely different according to differences in the condition of a floor on which the crawler vehicle moves.

Figure 2:
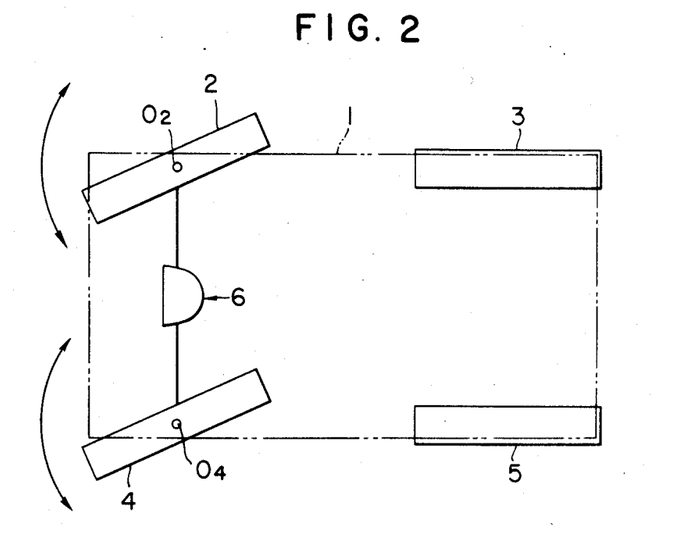
FIG. 2 is a schematic plan view of a four crawler driven vehicle according to this invention.

FIG. 2 shows a basic schematic view of a crawler vehicle according to this invention constructed by taking into consideration the defects of the prior art and the improvements of the stability as well as the loading space. The crawler vehicle of FIG. 2 comprises a vehicle body 1 on which a load or equipment is mounted and four crawler assemblies 9 comprising crawlers 2, 3, 4, 5, two being arranged on the bilateral sides of the body 1, respectively. Front crawler assemblies 9, i.e. front crawlers 2 and 4, are coupled through a steering mechanism 6 including a driving mechanism and a power transmission mechanism, which are described in detail hereunder in conjunction with FIGS. 3 through 5.

Figure 3:
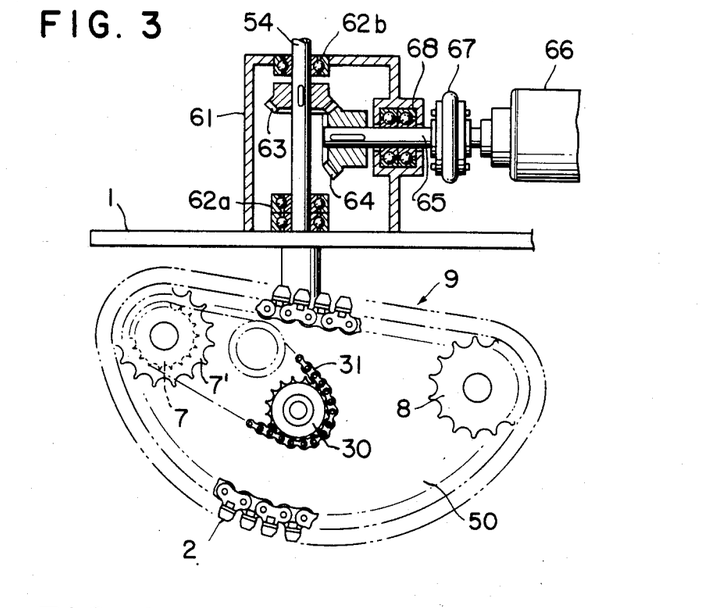
FIG. 3 is a side view, partially in section, of one crawler assembly and its driving mechanism of the crawler vehicle shown in FIG. 2.
Figure 5A:
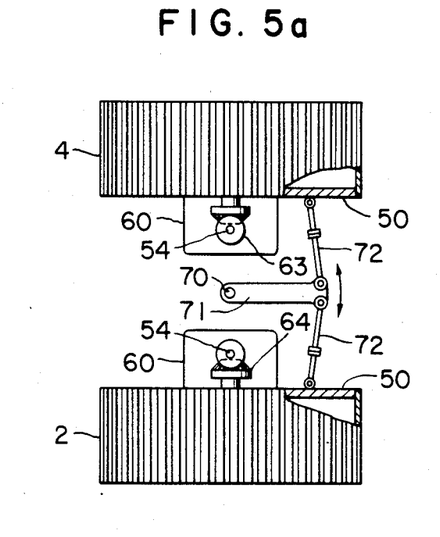
FIG. 5a is a schematic plan view showing a steering mechanism for front crawler assemblies of the vehicle of FIG. 2.

The crawler assembly 9 in FIG. 3 comprises a crawler 2, for example, formed by an endless belt stretched over a sprocket 7' operatively connected to a crawler drive gear 7, a follow-up gear 8, an arcuate crawler support plate 10 (FIG. 6), and a crawler base 50 (FIG. 5). The crawler is stretched so as to exhibit an arcuate surface which contacts the floor when it is driven. The crawler drive gear 7 is operatively engaged with a drive gear 30 through an endless chain 31 and the drive gear 30 is mounted on a power transmission shaft 51 which penetrates the crawler base 50 into a gear box 60 secured to the base 50 and is supported rotatably by bearings 52. The sprocket 7', the follow-up gear 8, and the crawler support 10 are operatively supported by the crawler base 50. A bevel gear 53 is mounted around the shaft 51 extending into the gear box 60 and meshed with a bevel gear 56 mounted around a drive transmission shaft 54 which is rotatably supported by bearings 55a and 55b in the gear box 60. The shaft 54 extends upwardly into a gear box 61 through the vehicle body base 1 and is rotatably supported by bearings 62a and 62b in the gear box 61. A bevel gear 63 is further mounted around the drive shaft 54 and meshed with a bevel gear 64 mounted around a drive shaft 65 in the gear box 61. The drive shaft 65 is operatively connected to an electric motor 66 through couplings 67 and rotatably supported by a bearing 68 to the gear box 61 secured to the vehicle body base 1.

In accordance with the construction described above, when the electric motor 66 drives, the drive shaft 65 rotates and the shaft 54 also rotates through the engagement of the bevel gears 63 and 64. The driving force is transmitted to the shaft 51 from the shaft 54 through the engagement of the bevel gears 53 and 56. Thus, the drive gear 30 of the crawler assembly 9 is rotated and the crawler drive gear 7 is then rotated through the chain 31 to thereby rotate the front, crawler 2. The front crawler 4 is also rotated in substantially the same manner as that described hereinabove.

In FIG. 5a, there is shown a steering mechanism, which is known per se, for the front crawlers 2 and 4 of the crawler vehicle according to this invention. The steering mechanism comprises a steering drive shaft 70 operatively connected to a drive source, not shown, such as electric motor and extending downwardly through the vehicle body base 1, a steering lever 71 operatively connected to the steering drive shaft 70 at one end, and coupling rods 72 each connected at one end to the crawler base 50 of the crawler assembly and at the other end to the other end of the steering lever 71. Thus, the front crawler assemblies are rotated about the drive shafts 54 by manipulation of the steering mechanism.

Figure 5B:
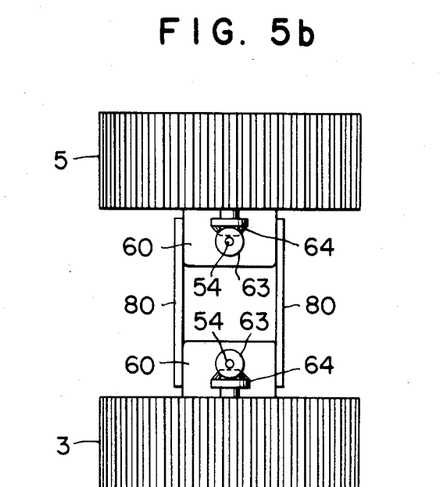
FIG. 5b is a schematic plan view showing a driving mechanism of the vehicle of FIG. 2.

FIG. 5b shows the rear crawler assemblies, in which the gear boxes 60 of both of the assemblies are secured by plates 80. The rear crawlers 3 and 5 are driven in substantially the same manner as that described before with respect to the front crawler 2. The crawler assemblies can easily be steered because each crawler exhibits an arcuate surface and contacts the floor with a relatively small and contacting surface.

Figure 6:
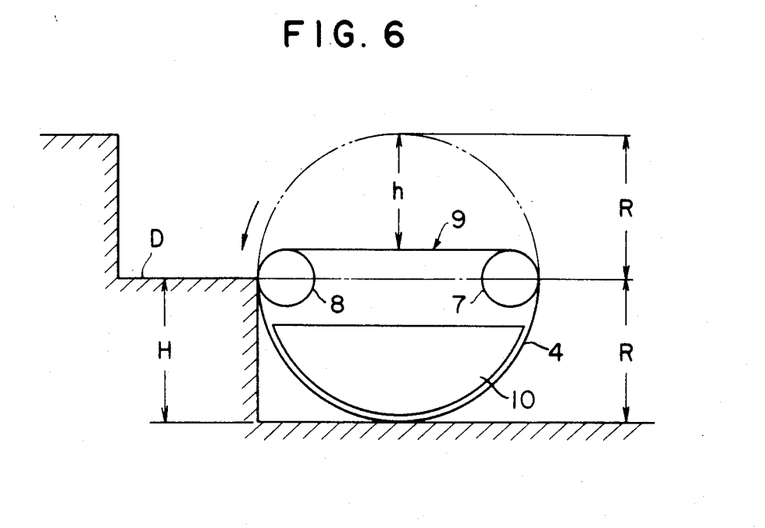
FIG. 6 is a schematic view of the front crawler assembly of the vehicle shown in FIG. 2 when the vehicle climbs stairs.

FIG. 6 shows a case where the crawler vehicle provided with the crawler assembly 9 constructed and connected as described hereinabove in conjunction with FIGS. 3 through 5 climbs stairs D. In this case, it is apparent that the crawler vehicle, i.e. crawler 4 in FIG. 6, can climb the stairs D when the radius R of the crawler assembly 9 is larger than the height H of one step of the stairs D. According to this invention, since the crawler assembly 9 is constructed so as to have an arcuate lower surface, it is possible to reduce the height of the car by h in comparison with a usual car, so that the center of gravity of the crawler vehicle is positioned at a relatively low position near the central portion of the crawler base to thereby increase the stability thereof.

Figure 4:
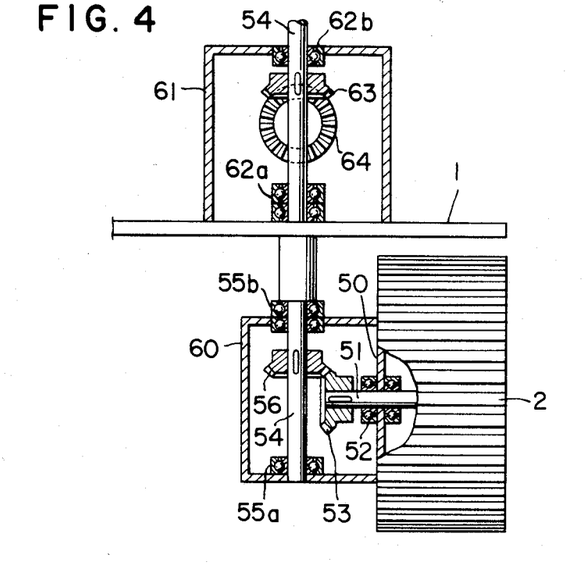
FIG. 4 is a front view of the crawler assembly shown in FIG. 3.
Figure 7:
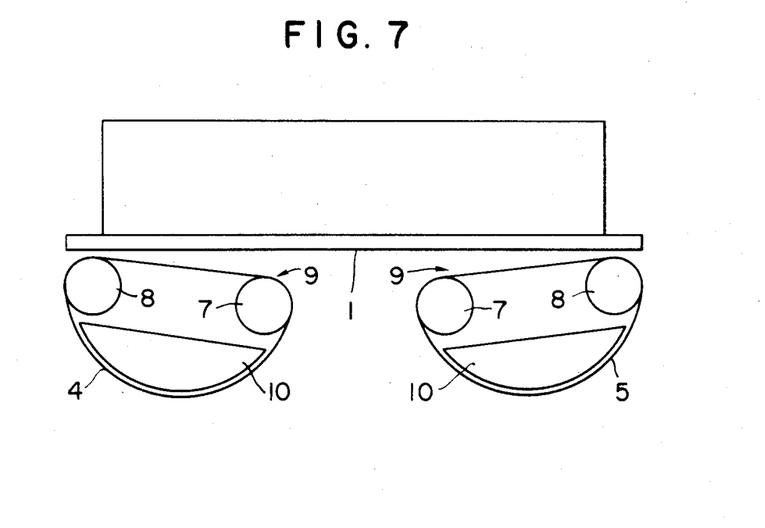
FIG. 7 is a schematic view showing one modification for attaching crawler assemblies according to this invention.
Figure 8A:
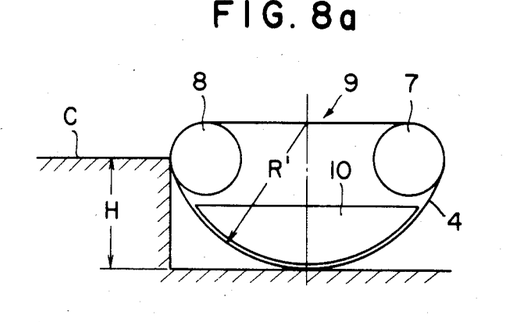
FIGS. 8a and 8b are views for explaining step climbing performance of the crawler assembly shown in FIG. 7.
Figure 8B:
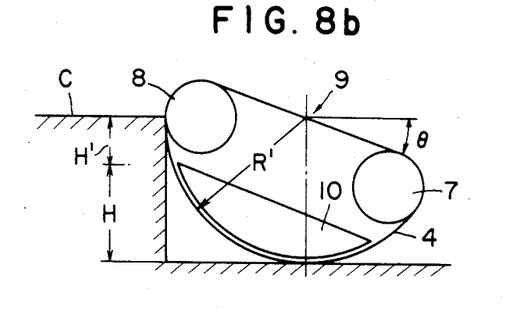

FIG. 7 shows a case where the crawler assemblies 9 are attached to the vehicle body 1 in an inclined manner with respect to a direction of travel, in which the crawler base 50 in FIG. 4 is secured to a gear box 60 in the inclined manner. For example, as shown in FIG. 8a, in a case where a crawler vehicle provided with an arcuate crawler assembly 9 having the radius R' climbs the step D having the height H (R'>H), the vehicle can climb a step having a height H+H' by attaching the crawler assembly 9 shown in FIG. 8a in an inclined manner by an increased angle $\theta$ with respect to the horizontal floor surface as shown in FIG. 8b, in which the height H' equals to R' sin$\theta$.

Figure 9:
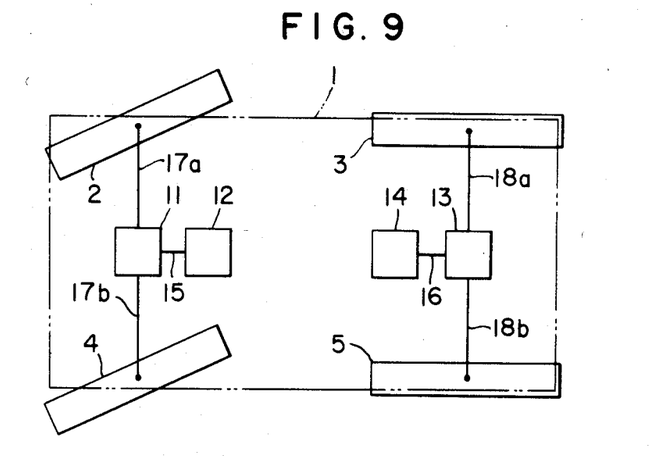
FIG. 9 is a schematic view in which differential gear mechanisms are coupled to the crawler driving mechanisms of the crawler vehicle shown in FIG. 2.

FIG. 9 shows a schematic view of another embodiment according to this invention, in which the front crawlers 2 and 4 and the rear crawlers 3 and 5 are driven by driving means through differential gears 11 and 13, respectively. Namely, in detail, the front crawlers 2 and 4 are driven by driving power from a drive source 12 through a power transmission shaft 15 and the inside crawler 4 is rotated at a relatively low speed by the operation of the differential gears 11 through a transmission shaft 17b and the outside crawler 2 is rotated at a relatively high speed by the differential gears 13 through a transmission shaft 17a. Regarding the rear crawlers 3 and 5, the inside crawler 5 is rotated at a relatively low speed and the outside crawler 3 is rotated at a relatively high speed in substantially the same manner as that of the front crawlers through a drive source 14, a power transmission shaft 16, the differential gears 13, and transmission shafts 18b and 18a. Thus, the inside and outside crawlers are rotated at different speeds to thereby obtain a good steering and cornering performance.

Figure 10:
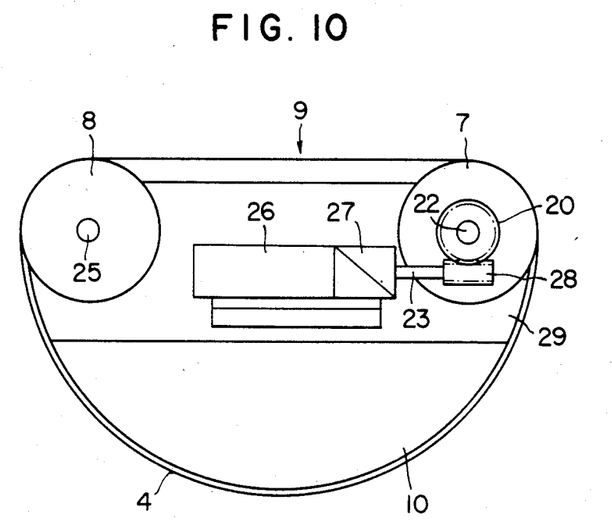
FIG. 10 is a schematic view of one modification of a crawler assembly of the crawler vehicle shown in FIG. 2 in which a crawler drive mechanism is accommodated in the crawler assembly.
Figure 11:
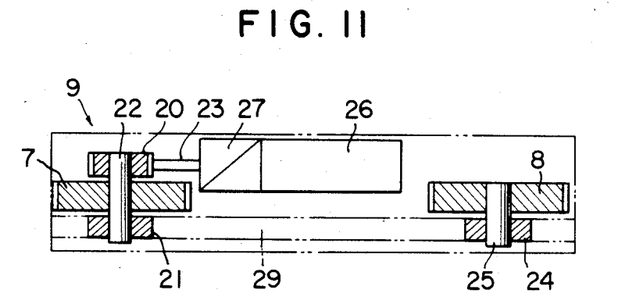
FIG. 11 is a sectional plan view of FIG. 10.

FIGS. 10 and 11 show further embodiment in which the crawlers 2, 3, 4 and 5 are independently operated by corresponding driving means accommodated in the crawler assembly 9, respectively. For example, regarding the crawler 4, rotary shafts 22 and 25 are horizontally supported by bearings 21 and 24 at the upper portion of a crawler base 29 of the crawler assembly 9. To the rotary shafts 22 and 25 are respectively secured a driving gear 7 and a supporting gear 8. An electric motor 26 is attached to the base 29 and the power from the motor 26 is transmitted through reduction gears 27 to a power transmission shaft 23 to which is secured a worm 28 which is meshed with worm gears 20 secured to the rotary shaft 22, whereby the driving wheel 7 is driven by the energization of the electric motor 26.

According to this embodiment, the driving gears 7 can be driven by independently energizing the motors 26 to thereby drive the crawlers 2, 3, 4 and 5 respectively at different speeds without utilizing the differential gears. Moreover, since the motor 26 is attached to the base 29 and the power transmission mechanism is also attached to the crawler assembly 9, the attachment of the drive source such as motor 26 and the power transmission mechanism to the vehicle body can be eliminated, thus reducing the size of the crawler drive mechanism as well as improving the balance of weight of the vehicle body.

Figure 12A:
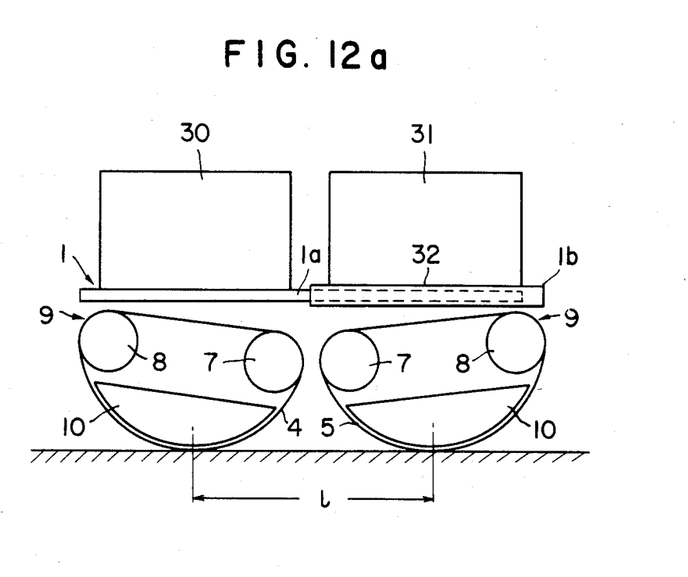
FIGS. 12a and 12b and FIG. 13 are schematic views of further modifications of the crawler vehicle of FIG. 2 in which a slide mechanism is applied to the crawler vehicle body base.
Figure 12B:
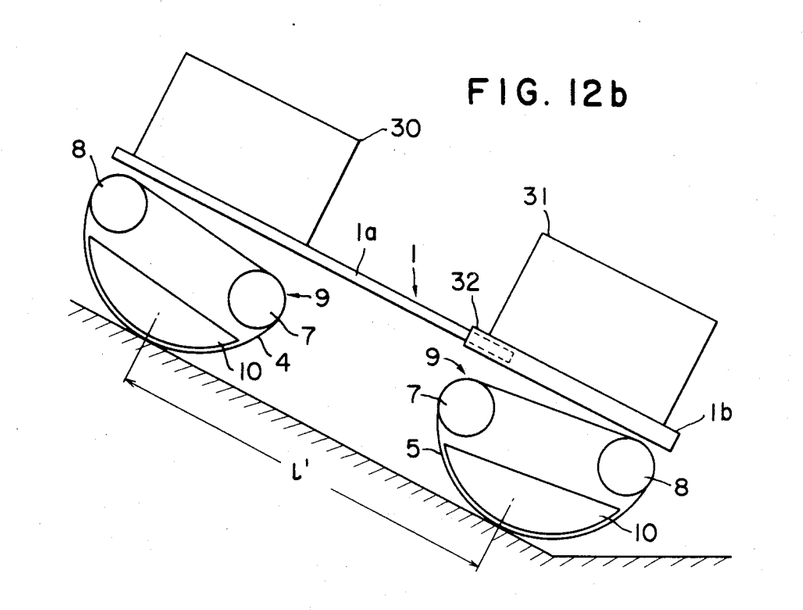

Usually, on the vehicle body base 1 are mounted inspection and control equipment or other loads 30 and 31 as shown in FIGS. 12a and 12b showing one embodiment of this invention, in which the vehicle body base 1 comprises two portions 1a and 1b which have slidable telescopic construction. According to this embodiment, the front and rear crawler assemblies are attached to the front and rear base portions 1a and 1b, respectively. In FIG. 12a, a distance between the front and rear crawler assemblies is narrowed (distance l) and in FIG. 12b, the distance is widened (distance l') by a slide mechanism 32 described hereinafter.

In a case where the crawler vehicle moves on the flat floor, the distance between the front and rear crawler assemblies is narrowed as shown in FIG. 12a, so that the vehicle can easily be turned with a small turning radius and in a case where the crawler vehicle moves along a slope or climbs stairs, the distance is widened as shown in FIG. 12b, so that the vehicle can stably move or run.

Figure 13:
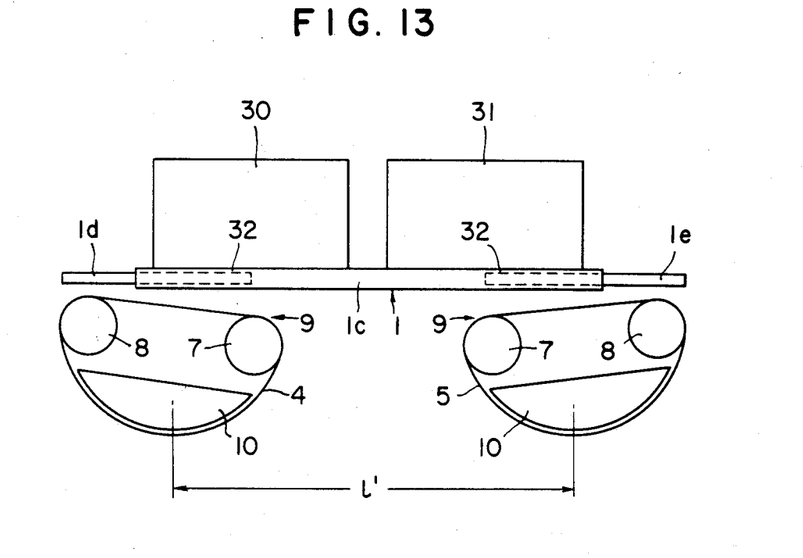

FIG. 13 shows another example of the slidable vehicle body base 1 which comprises three portions 1c, 1d and 1e, in which the portions 1d and 1e are telescopically constructed with respect to the central portion 1c by slide mechanisms 32. The front and rear crawler assemblies are attached to the vehicle base portions 1d and 1e, respectively and the distance l'' between the front and rear crawler assemblies can be narrowed or widened in accordance with the floor conditions as described before.

Although the slide mechanism 32 is well known per se, one example applied to the crawler vehicle (FIG. 12a) of this invention will be described hereunder in conjunction with FIG. 14.

Figure 14:
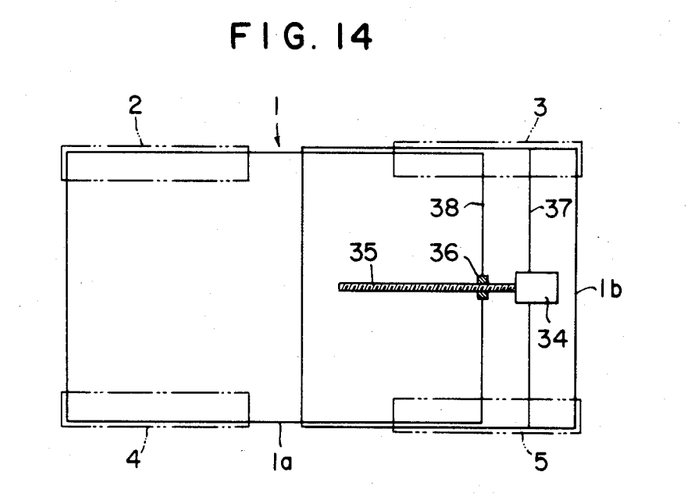
FIG. 14 is a schematic view of the slide mechanism applicable to the slide mechanism shown in FIGS. 12a and 12b and FIG. 13.

Referring to FIG. 14, the rear vehicle body base 1b is provided with a support member 37 to which an electric motor 34 is secured and a threaded rod 35 is connected to the motor 34 as an output shaft thereof. The threaded rod 35 is engaged with nut means 36 secured to a support member 38 attached to the front body base 1a, so that the distance between the front and rear crawler assemblies can be narrowed or widened by energizing the motor 34 to rotate the threaded output shaft 35 in the clockwise or counterclockwise direction.

Figure 15:
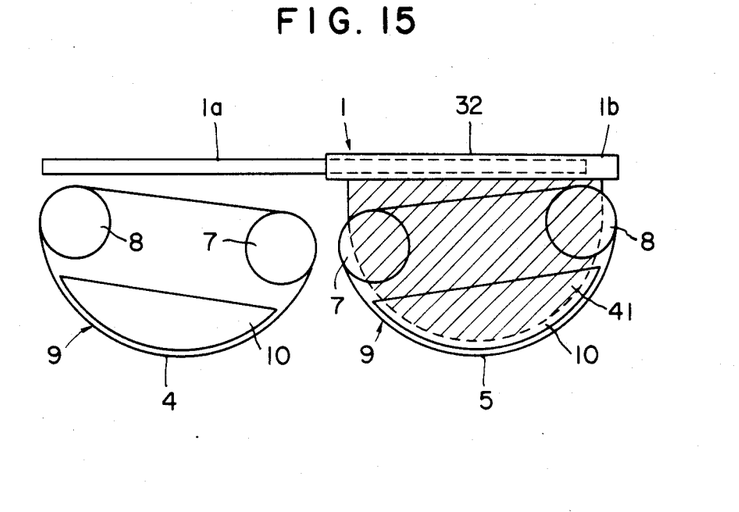
FIGS. 15 and 16 are schematic views showing an increased load accommodating space for the crawler vehicle shown in FIG. 2.
Figure 16:
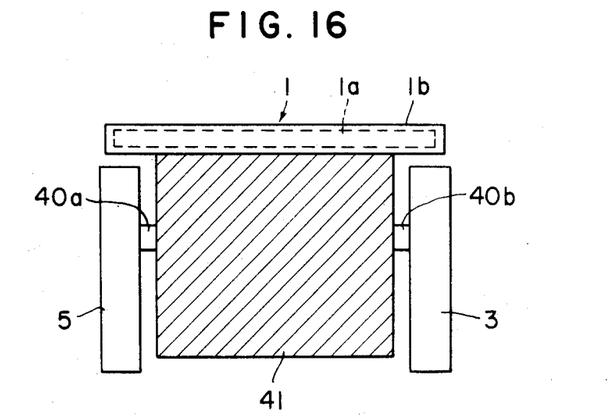

Moreover, according to this invention, particularly regarding the embodiment shown in FIGS. 10 and 11, a space for accommodating loads or equipments can be defined below the rear vehicle body base 1b between the rear crawlers 3 and 5 as shown in FIGS. 15 and 16, in which an accommodating box 41 is secured to the rear base 1b. To the sides of the accommodating box 41 are secured to respective ends of supporting members 40a and 40b which are attached at the other ends to their crawler bases of the rear crawler assemblies. Thus, the increased space for accommodating or mounting loads or equipment can be ensured and in addition, the center of gravity of the crawler vehicle can be positioned at a relatively low position to thereby improve the stability of the crawler vehicle during the operation thereof.

It is to be understood by those skilled in the art that the foregoing description refers to some preferred embodiments of this invention and that various modifications, changes and combinations may be made without departing from the true scope and spirit of the invention as defined in the appended claims.

What is claimed is:

1. A crawler driven vehicle comprising:
 a vehicle body;
 four arcuate crawler assemblies comprising two front crawler assemblies and two rear crawler assemblies attached to bilateral sides of said vehicle body;
 means for driving said crawler assemblies;
 means operatively connected to said driving means for transmitting driving force from said driving means to said crawler assemblies; and
 means operatively connected to said front crawler assemblies for steering said front crawler assemblies,
 each of said crawler assemblies comprising a drive gear mounted around a rotary shaft of said power transmitting means, a crawler drive gear operatively connected to said drive gear of said rotary shaft, a follow-up gear to be driven in accordance with said crawler drive gear, an arcuate crawler support plate, and a crawler base member supporting said crawler drive gear, said follow-up gear and said crawler support plate, said crawler being stretched over said crawler drive gear, said follow-up gear, and said support plate so as to exhibit an arcuate running surface of the crawler vehicle.

2. The crawler vehicle according to claim 1 wherein said crawler assemblies are attached to said vehicle body in an inclined manner by a predetermined increased angle with respect to an advance direction of the crawler vehicle.

3. The crawler vehicle according to claim 1 wherein said drive means includes differential gears so as to rotate said crawler assemblies at different speeds, respectively.

4. The crawler vehicle according to claim 1 wherein said drive means are accommodated in said crawler assemblies, respectively.

5. The crawler vehicle according to claim 1 wherein said vehicle body includes a body base comprising a plurality of parts which are relatively telescopically connected and slid respectively by a slide mechanism so as to vary a distance between said front and rear crawler assemblies.

6. A crawler vehicle according to claim 1 wherein said arcuate crawler assemblies are substantially semi-circular, having a substantially constant radius of curvature R.

7. A crawler vehicle according to claim 6 wherein the magnitude of R is on the order of the height of a riser of a step.

* * * * *